United States Patent
Curry et al.

(10) Patent No.: US 6,739,840 B2
(45) Date of Patent: May 25, 2004

(54) SPEED CONTROL OF VARIABLE SPEED PUMP

(76) Inventors: Mark William Curry, 805 Oak Park Dr., Morgan Hill, CA (US) 95037; Daniel Paul Greenbank, 660 N. 18th St., San Jose, CA (US) 95112; Danny Cam Toan Lu, 1521 Felton St., San Francisco, CA (US) 94134

( * ) Notice: Subject to any disclaimer, the term of this patent is extended or adjusted under 35 U.S.C. 154(b) by 12 days.

(21) Appl. No.: 10/154,410

(22) Filed: May 22, 2002

(65) Prior Publication Data

US 2003/0219342 A1 Nov. 27, 2003

(51) Int. Cl.$^7$ ................................. F04B 49/06
(52) U.S. Cl. .................... 417/44.1; 417/326; 417/53
(58) Field of Search ............... 417/44.1, 44.2, 417/44.3, 44.4, 42, 53, 326, 423.4; 415/90, 118

(56) References Cited

U.S. PATENT DOCUMENTS

| | | | | |
|---|---|---|---|---|
| 4,699,570 A | * | 10/1987 | Bohn | 417/6 |
| 4,700,315 A | | 10/1987 | Blackburn et al. | 364/477 |
| 4,728,869 A | | 3/1988 | Johnson et al. | 318/335 |
| 5,165,864 A | * | 11/1992 | Burger et al. | 417/244 |
| 5,575,853 A | * | 11/1996 | Arami et al. | 118/708 |
| 5,616,208 A | | 4/1997 | Lee | 156/345 |
| 5,626,679 A | | 5/1997 | Shimizu et al. | 118/723 |
| 5,746,581 A | * | 5/1998 | Okumura et al. | 417/2 |
| 5,785,796 A | | 7/1998 | Lee | 156/345 |
| 5,888,579 A | | 3/1999 | Lun | 427/8 |
| 5,971,711 A | * | 10/1999 | Noji et al. | 417/2 |
| 6,022,195 A | * | 2/2000 | Gaudet et al. | 417/27 |
| 6,088,508 A | | 7/2000 | Ishibashi et al. | 388/800 |
| 6,200,107 B1 | | 3/2001 | Brewster | 417/251 |
| 6,416,290 B1 | * | 7/2002 | Yamauchi | 417/32 |
| 6,419,455 B1 | * | 7/2002 | Rousseau et al. | 417/36 |
| 6,474,949 B1 | | 11/2002 | Arai et al. | 417/2 |
| 6,592,340 B1 | * | 7/2003 | Horo et al. | 417/293 |

FOREIGN PATENT DOCUMENTS

| | | | |
|---|---|---|---|
| EP | 0 900 940 A2 | 3/1999 | F04D/27/02 |
| EP | 1 043 645 A1 | 10/2000 | G05D/16/20 |
| EP | 1 081 380 A1 | 3/2001 | F04B/49/06 |
| WO | WO 01/96972 A2 | 12/2001 | G05D/16/20 |

OTHER PUBLICATIONS

International Search Report for International Application No. PCT/US 03/15030, dated Aug. 5, 2003.

* cited by examiner

*Primary Examiner*—Justine R. Yu
*Assistant Examiner*—Han L Liu
(74) *Attorney, Agent, or Firm*—Joseph Bach; Moser, Patterson & Sheridan L.L.P.

(57) ABSTRACT

Method, article of manufacture and apparatus for monitoring operating characteristics of a system comprising a variable speed vacuum pump. Operating characteristics reflective of gas load on the pump are observed for behavior indicating a change in the gas load. In one embodiment, the operating characteristic is the current in a power signal being provided to the pump.

25 Claims, 7 Drawing Sheets

SPEED CONTROL OF VARIABLE SPEED PUMP

BACKGROUND OF THE INVENTION

1 Field of the Invention

The present invention generally relates to vacuum pumping systems.

2. Description of the Related Art

Semiconductor wafer processing is generally performed in process chambers having sub-atmospheric pressures. Vacuum pumping systems are commonly utilized to achieve and maintain sub-atmospheric pressures within the processing chambers and are typically remotely located (i.e., outside the clean room) to prevent adverse affects on substrate processing.

Vacuum pumping systems serving a typical process chamber generally have a pumping capacity in the range of 1600 l/min up to 25,000 l/min in order to satisfy the needs of typical substrate processing operations. Vacuum pumping systems of this capacity generally consume up to about 6 kilowatts per hour of electricity. Further, vacuum pumps are typically operated at full speed throughout processing, while pressure is controlled by gas flow, throttle valve and isolation valve actuation. Accordingly, vacuum pumping systems are a significant source of power consumption in semiconductor processing systems, as well as other systems.

As a result, new approaches to reducing power consumption are constantly being explored. Reducing the power consumption is desirable both for reducing the energy associated with maintaining vacuum pressures and for reducing the heat generated and subsequent cooling requirements of the vacuum system, the clean room and the facility. Additionally, conservation of energy is additionally desirable for social, economic and environmental benefits.

One possible approach to conserving power is to utilize variable speed pumps. Typically, variable speed vacuum pumping systems include a motor driver which operates to maintain a selected speed setpoint(s). The speed setpoint(s) is determined according to the desired processing conditions. During operation, the speed of the pump may be changed according to the selected speed setpoints. By controlling the speed of the pump it is possible to slow the motor speed when a higher speed is not needed. However, this manner of speed control requires substantial changes to system software in order to integrate a variable speed pump into existing systems. Making software changes to existing systems is both expensive and time-consuming, and requires tracking a number of different software versions.

Therefore, there is a need for a vacuum pumping system that reduces power consumption.

SUMMARY OF THE INVENTION

The present invention generally provides methods, apparatus and articles of manufacture for monitoring operating characteristics of a system comprising a variable speed vacuum pump.

One embodiment provides a method of operating a variable speed pump in a vacuum processing environment comprising a vacuum chamber in fluid communication with the variable speed pump and wherein the variable speed pump is in electrical communication with a power source. The method comprises actuating the variable speed pump; sensing an operating characteristic of the variable speed pump indicative of a gas load on the pump; and in response to determining a predetermined behavior of the sensed operating characteristic, changing a speed of the variable speed pump.

Another embodiment provides a method of monitoring at least one operating characteristic of a variable speed pump in a vacuum processing environment comprising a vacuum chamber in fluid communication with the variable speed pump and wherein the variable speed pump is in electrical communication with a power source. The method comprises actuating the variable speed pump by provision of a power signal to the variable speed pump; monitoring a behavior of the power signal; and determining a change in the gas load by analysis of the monitored power signal.

Another embodiment provides a method of operating a variable speed pump in a vacuum processing environment comprising a vacuum chamber in fluid communication with the variable speed pump and wherein the variable speed pump is in electrical communication with a power source. The method comprises operating the variable speed pump; for an operating speed of the variable speed pump, sensing an operating characteristic of the variable speed pump reflective of a gas load on the pump; and reducing a speed of the variable speed pump when the sensed operating characteristic is indicative of a predetermined gas load characteristic requiring less than the operating speed of the pump.

Yet another embodiment provides a computer readable medium containing a program which, when executed, performs an operation for controlling a variable speed pump in a vacuum processing environment comprising a vacuum chamber in fluid communication with the variable speed pump and wherein the variable speed pump is in electrical communication with a power source. The operation comprises actuating the variable speed pump; sensing an operating characteristic of the variable speed pump indicative of a gas load on the pump; and in response to determining a predetermined behavior of the sensed operating characteristic, changing a speed of the variable speed pump.

Yet another embodiment provides a computer readable medium containing a program which, when executed, performs an operation for monitoring at least one operating characteristic of a variable speed pump in a vacuum processing environment comprising a vacuum chamber in fluid communication with the variable speed pump and wherein the variable speed pump is in electrical communication with a power source. The operation comprising actuating the variable speed pump by provision of a power signal to the variable speed pump; monitoring a behavior of the power signal; and determining a change in the gas load by analysis of the monitored power signal.

Yet another embodiment provides a computer readable medium containing a program which, when executed, performs an operation for operating a variable speed pump in a vacuum processing environment comprising a vacuum chamber in fluid communication with the variable speed pump and wherein the variable speed pump is in electrical communication with a power source. The operation comprises, for an operating speed of the variable speed pump, sensing an operating characteristic of the variable speed pump reflective of a gas load on the pump; and issuing a control signal to reduce a speed of the variable speed pump when the sensed operating characteristic is indicative of a predetermined gas load characteristic requiring less than the operating speed of the pump.

Still another embodiment provides a pump speed controller, comprising: a processor; a sensor interface connected to the processor for receiving sensor input from a sensor configured to collect pump operating data; and a control signal interface connected to the processor for transmitting a control signal to a variable speed vacuum pump; wherein the processor is configured by instructions to perform an operation comprising outputting a control signal instructing the variable speed vacuum pump to change its speed upon receipt, via the sensor interface, of pump operating data indicative of a changing gas load on the variable speed vacuum pump.

Yet another embodiment provides a vacuum pump control system, comprising: a vacuum chamber; a variable speed vacuum pump connected to the vacuum chamber; a power supply in electrical communication with the variable speed vacuum pump; a sensor configured to collect operating characteristic information of the speed controller, wherein the operating characteristic information is reflective of a gas load on the variable speed vacuum pump; and a pump speed controller in communication with the variable speed vacuum pump and the sensor and configured to issue speed control signals to the variable speed pump in response to sensor input from the sensor.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

In general, the present invention relates to monitoring operating characteristics of a system comprising a variable speed vacuum pump. In one embodiment, a characteristic of a power signal being delivered to the variable speed vacuum pump is monitored. One such characteristic is current, for example. When the current being monitored exhibits a behavior indicative of a change in the gas load on the variable speed vacuum apparatus, the speed of the variable speed vacuum pump is changed. In some embodiments, other devices (e.g., pressure gauges, pressures switches, etc.) provide additional information (in tandem with the current information) useful in operating the variable speed vacuum pump.

One embodiment of the invention is implemented as a program product for use with a computerized device. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
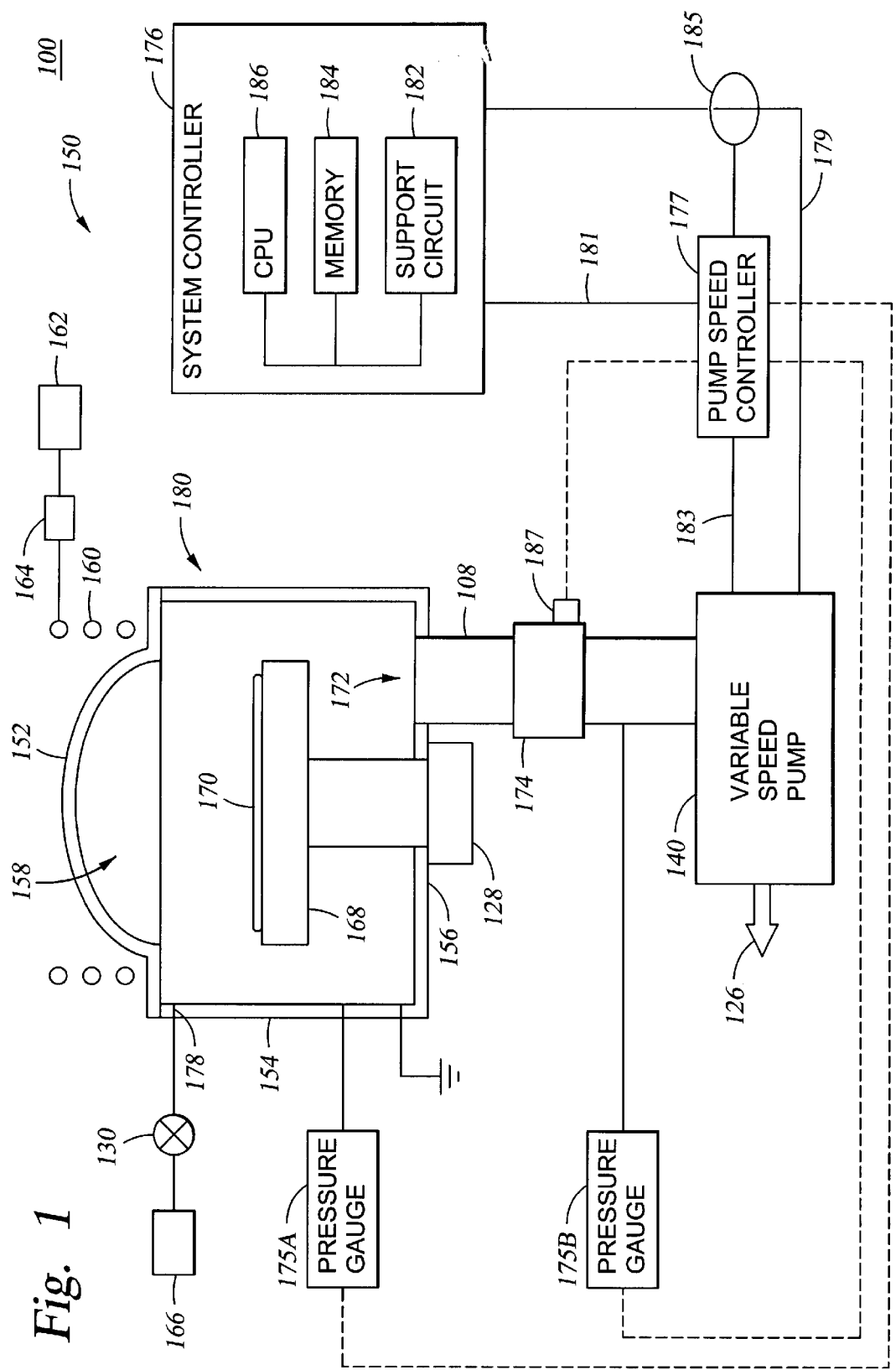
FIG. 1 depicts a substrate processing chamber coupled to one embodiment of a vacuum system.

FIG. 1 depicts a schematic of one embodiment of a semiconductor processing system 100 comprising a vacuum chamber 150. The vacuum chamber 150 generally may be any type of chamber utilized in a semiconductor processing environment and which is at least temporarily under vacuum conditions. For purposes of illustration, the vacuum chamber 150 will be described as a processing chamber and, in particular, as an etch chamber, i.e., a chamber wherein an etch process is performed upon a workpiece. However, other chambers such as physical vapor deposition chambers, chemical vapor deposition chambers, ion implantation chambers, transfer chambers (i e., cluster tools), pre-clean chambers, de-gas chambers, load lock chambers, orientation chambers and the like can use aspects of the invention to advantage. Further, aspects of the invention may be used to advantage with a cluster tool in which one or more chambers are individually serviced by different pumps or where a plurality of chambers are collectively serviced by an integrated pumping system. Examples of some of illustrative chambers are described in U.S. Pat. Nos. 5,583,737, issued Dec. 10, 1996; 6,167,834, issued Jan. 2, 2001; 5,824,197, issued Oct. 20, 1998; and 6,254,328, issued Jul. 3, 2001, all of which are incorporated by reference in their entireties.

In the embodiment depicted in FIG. 1, the vacuum chamber 150 is an etch chamber and generally includes a chamber body 180 having a bottom 156, walls 154 and a lid 152. The walls 154 generally have a sealable aperture disposed therethrough to facilitate entry and egress of a substrate (workpiece) 170 from the vacuum chamber 150. The walls 154 are coupled to electrical ground and typically include one or more inlet ports 178 disposed therein. The ports 178 are used for selectively flowing gas(es) into the vacuum chamber 150 from a gas source 166.

The lid 152 is supported by the walls 154. In one embodiment, the lid 152 is a quartz dome circumscribed by a plurality of coils 160. The coils 160 are coupled to a power source 162 through a matching circuit 164 and supplies RF power to the coils 160. The power ignites and/or maintains a plasma formed from the process gases within the chamber body 180.

The substrate 170 is supported within the chamber by a pedestal 168. The pedestal 168 may additionally thermally regulate the substrate 170 by, for example, the application of backside gas, resistive heating, circulation of heat transfer fluid therein or by other methods.

An exhaust port 172 is formed in the bottom 156 of the chamber body 180. A vacuum pump 140 is coupled to the vacuum chamber 150 by a foreline 108 disposed between the exhaust port 172 and the vacuum pump 140. In one embodiment, a valve assembly 174 is disposed in the foreline 108 to selectively control fluid communication between the vacuum pump 140 and the vacuum chamber 150. Illustratively, the valve assembly 174 may include one or more valves which may be individually operated. In a particular example, the valve assembly 174 includes a throttle valve. However, any appropriate valve may be used to advantage including, for example, a gate valve.

Pressure is controlled within the chamber 150, at least in part, by articulating the valve(s) of the valve assembly 174. Pressure within the chamber may be determined from one or more pressure gauges. Illustratively, a pressure gauge 175A is shown in communication with the processing cavity defined by the chamber body 180. Alternatively or additionally, a pressure gauge 175B is disposed in the foreline 108, downstream from the valve assembly 174 and up stream from the vacuum pump 140.

The vacuum pump 140 may comprise any suitable type of variable speed vacuum pump. Examples of vacuum pumps typically utilized for evacuating processing chambers are roots pumps and hook and claw pumps. Other vacuum pumps, such as turbo molecular pumps, rotary vane pumps, screw type pumps, tongue and groove pumps and positive displacement pumps among others may also be utilized. The particular type of variable speed vacuum pump used will depend on the processing requirements for the processing to be performed in the chamber 150. By way of example, one particular pump which may be used to advantage is the iPUP® (integrated Point of Use Pump) available from Applied Material, Inc. of Santa Clara, Calif. Further, processing systems commonly use staged or cooperative pumping arrangements. For example, it may be desirable to have a first pump capable of pumping the chamber 150 to a first pressure within a first pressure regime and a second pump capable of pumping the chamber 150 to a second pressure within a second pressure regime, where the second pressure is lower than the first. For example, the first pressure regime may be a very low-pressure regime and the second pressure regime may be an ultra-low-pressure regime. Accordingly, it is contemplated that the vacuum pump 140 may in fact represent two or more vacuum pumps, or be connected to at least one other vacuum pump.

In the illustrated embodiment, application of power to the vacuum pump 140 is controlled by a system controller 176, which is coupled to the vacuum pump 140 by a power supply line 179. While the power supply line 179 may be any suitable power transmission medium, in a particular embodiment, the power supply line 179 is a three-phase power line adapted to deliver a 208V alternating current (AC) signal.

In addition to controlling a power signal to the vacuum pump 140, the system controller 176 is more generally configured to control of at least some of the other components of the vacuum chamber 150. In general, the controller may be any device capable of carrying out the operation(s) of the chamber 150. Although only one system controller 176 is shown, a number of system controllers may be provided to handle varying tasks. In one embodiment, the system controller 176 generally comprises a central processing unit (CPU) 186, support circuits 182 and memory 184, are coupled to the vacuum chamber 150 and vacuum system 100. The CPU 186 may be one of any form of computer processor that can be used in an industrial setting for controlling various chambers and subprocessors. The memory 184 is coupled to the CPU 186, whereby the CPU 186 may be read from and/or write to the memory 184. The memory 184, or computer-readable medium, may be one or more memory devices such as random access memory (RAM), read only memory (ROM), erasable programmable memory (EPROM), floppy disk, hard disk, or any other form of digital storage, local or remote. The support circuits 182 are coupled to the CPU 186 for supporting the processor in a conventional manner. These circuits include cache, power supplies, clock circuits, input/output circuitry, subsystems, and the like.

The speed of the vacuum pump 140 is generally controlled by a pump speed controller 177. Illustratively, the pump speed controller 177 is disposed inline between the vacuum pump 140 and the system controller 176. In the illustrated in-line embodiment, the pump speed controller 177 is connected to the system controller 176 by first a transmission medium 181 and is connected to the vacuum pump 140 by a second transmission medium 183. In one embodiment, the transmission mediums 181, 183 are cables or other physical connectors. However, in other embodiments, the pump speed controller 177, the system controller 176 and the vacuum pump 140 are configured for wireless transmissions (e.g., bluetooth), in which case the transmission mediums 181, 183 may be air (or some other fluid environment).

Even though the system controller 176 is shown physically connected to the pump speed controller 177 (via the transmission medium 181), it should be noted that, in one embodiment, the signals issued by the system controller may pass through the pump speed controller, unread and unaltered. That is, cooperative operation of the system controller 176 and the pump speed controller 177 is not needed. Accordingly, in another embodiment, the system controller 176 need not be physically coupled to the pump speed controller 177. Instead, the transmission medium 181 may simply by-bass the pump speed controller 177 and be connected directly to the pump 100. In still another embodiment, some signals may be provided from the system controller 176 to the pump speed controller 177 while others are not. For example, it is contemplated that in one embodiment system controller 176 may issue an ON/OFF signal to the pump speed controller 177 to turn the pump speed control signals ON or OFF. In another embodiment, the system controller 176 provides pump speed control signals to the pump speed controller 177, thereby causing the pump speed controller 177 to issue a pump speed control signal to the pump 100 when the pump speed controller 177 would otherwise not have done so.

In one embodiment, the speed control signals output from the pump speed controller 177 to the vacuum system 100 are responsive to a determination of an operating characteristic(s) being monitored by the pump speed controller 177. Illustrative operating characteristics include power, voltage, current, etc. In a particular embodiment, the pump speed controller 177 receives signals from a current sensor 185 to determine the power consumption of the vacuum pump 140. In one embodiment, the current sensor comprises a torroid sensor.

In addition to receiving signals from the current sensor 185, the pump speed controller 177 may receive signals from other devices, which signals are then used in operating the variable speed pump 140. For example, in one embodiment the pump speed controller 177 is coupled to a pressure switch 187. The pressure switch 187 is configured to send a signal indicative of the position (e.g., open or closed) of the valve assembly 174. In another embodiment, the pump speed controller 177 is coupled to one or more of the pressure gauges 175A–B. in any case, input from such devices to the pump speed controller 177 may be used to operate the variable speed pump 140 in a power efficient manner, as will be described in more detail below.

Particular embodiments of the vacuum pump 140 and the pump speed controller 177 will now be described with reference to FIG. 2 and FIG. 3, respectively.

Figure 2:
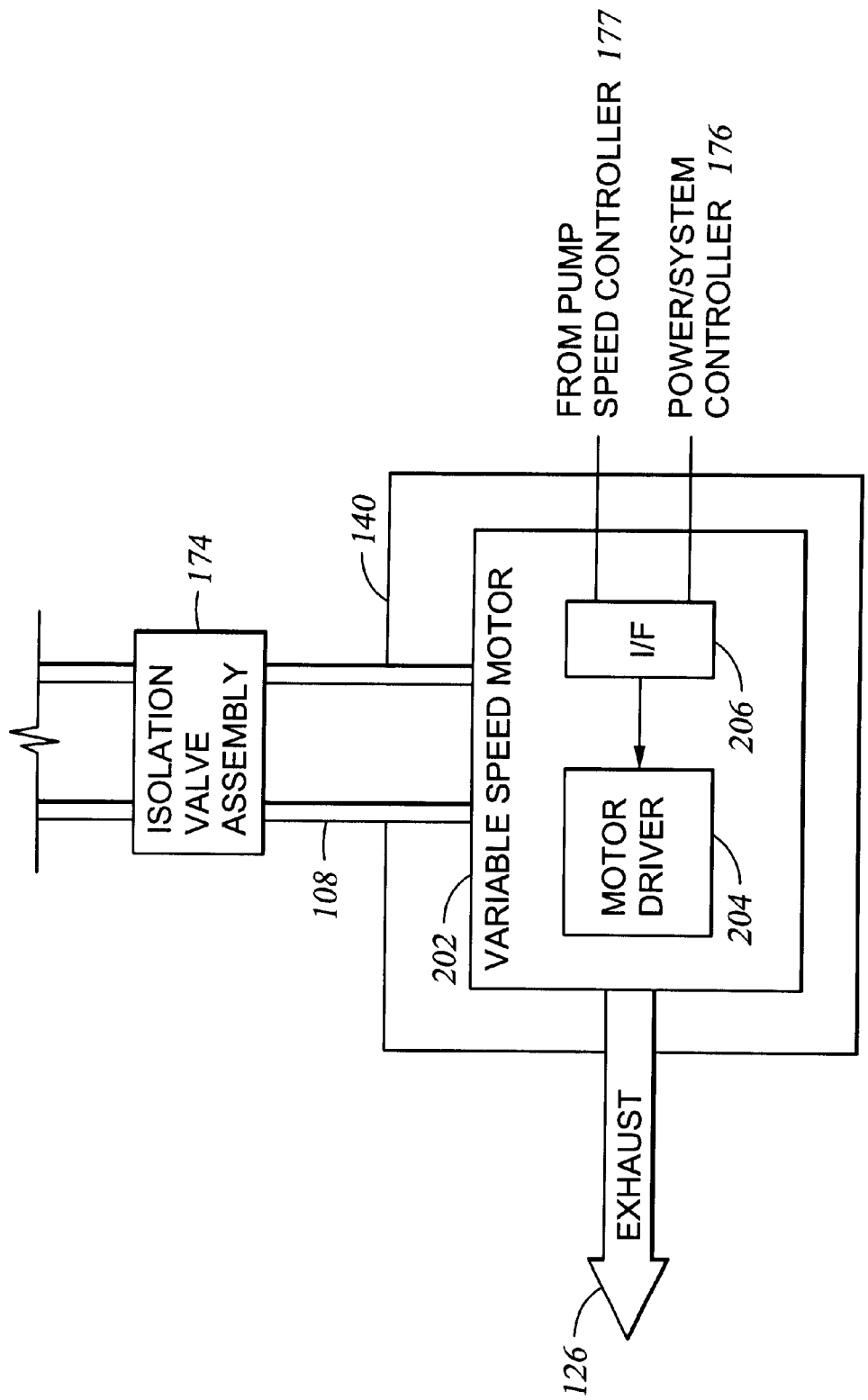
FIG. 2 depicts one embodiment of a variable speed pump.

Referring first to FIG. 2, a particular embodiment of the vacuum pump 140 is shown. For simplicity, the vacuum system 100 is shown comprising only a variable speed motor 202 and the exhaust 126. However, it is understood that the vacuum system 100 may include any number of well-known components. The speed of the variable speed motor 202 is controlled by a motor driver 204. The motor driver takes as input, the power signal from the system controller 176 and control signals from the system controller 176 and the pump speed controller 177, via a pump interface 206. Generally, the speed of the motor 202 (given in revolutions per minute (RPM) or hertz (Hz)) is determined by a user-selected setpoint. In one embodiment, the user-selected setpoint may be input to (e.g., by a human operator) and stored in the motor driver 177. In operation, the motor driver 204 operates to maintain the user-selected speed setpoint, even during changes in the gas load on the motor 202. For example, an increasing gas load on the motor 202 causes the motor driver 204 to increase the motor torque in order to maintain the selected speed setpoint.

Figure 3:
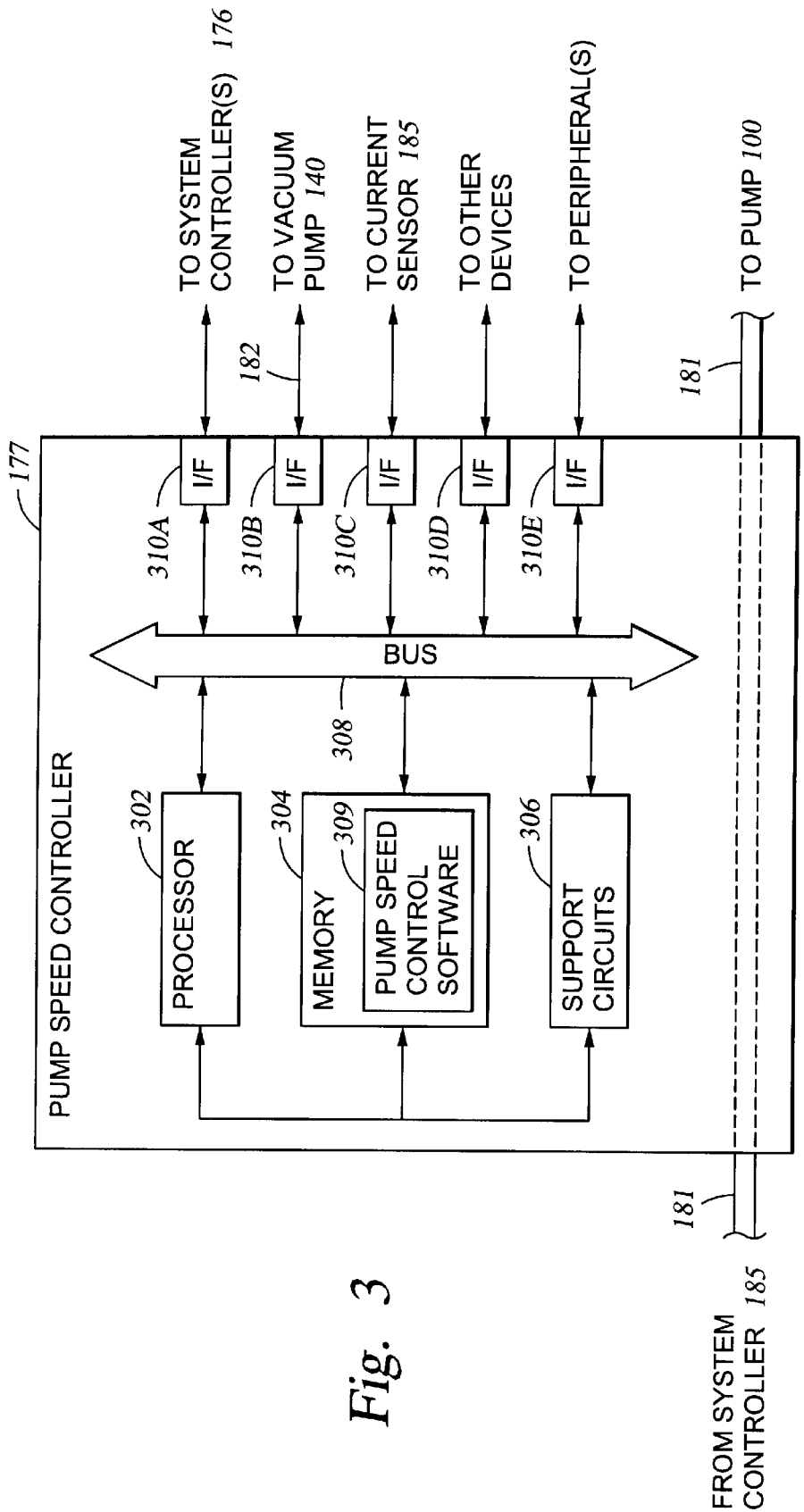
FIG. 3 depicts one embodiment of a pump speed controller.

Referring now to FIG. 3, an embodiment of the pump speed controller 177 is shown. In one embodiment, the pump speed controller 177 generally comprises a central processing unit (CPU) 302, memory 304 and support circuits 306 each of which are coupled to one another by a bus 308. The CPU 302 may be one of any form of computer processor that can be used in an industrial setting for controlling the speed of the variable speed pump 140. The support circuits 306 are coupled to the CPU 302 for supporting the CPU 302 in a conventional manner. These circuits may include cache, power supplies, clock circuits, input/output circuitry, subsystems, and the like. The memory 304 is coupled to the CPU 302 by the bus 308, whereby the CPU 302 may be read from and/or write to the memory 304. The memory 304, or computer-readable medium, may be one or more memory devices such as random access memory (RAM), read only memory (ROM), erasable programmable memory (EPROM), floppy disk, hard disk, or any other form of digital storage, local or remote.

The memory 304 is shown containing pump speed control software 309. When executed, the pump speed control software 309 may configure the CPU 302 to monitor information related to one or more operating characteristics of semiconductor processing system 100. In one aspect, an operating characteristic may be a characteristic of vacuum pump 140 monitored by a sensor. The sensor may generate an output signal which, when processed, causes the CPU 302 (by execution of the pump speed control software 309) to issue instructions for operating the vacuum pump 140 in a specified manner. For example, the CPU may issue instructions to the vacuum pump 140 in the form of control signals for changing an operating speed of the vacuum pump 140.

Information is input to and output from the pump speed controller 177 via one or more interfaces. Illustratively, five interfaces 310A–E are shown. A first interface 310A couples the pump speed controller 177 to the system controller 176. Information exchanged via the first interface 310A may include, for example, status information, ON/OFF signals and interlock signals. A second interface 310B couples the pump speed controller 177 to the vacuum pump 140 via the transmission medium 183. Information exchanged via the second interface 310B may include, for example, control signals for changing the operating speed of the vacuum pump 140. Third and fourth interfaces 310C–D provide sensor information to the pump speed controller 177. In particular, the third interface 310C may be connected to the current sensor 185 depicted in FIG. 1. The fourth interface 310D is representative of one or more interfaces that may, in some embodiments, be connected to other sensors. For example, one or both of the pressure gauges 175A–B and/or the pressure switch 187 may be connected to the pump speed controller 177 through fourth interface 310D. A fifth interface 310E is representative of one or more interfaces provided to facilitate connection to one or more peripheral components. For example, it may be desirable to connect the pump speed controller 177 to a laptop computer, personal digital assistant (PDA), wireless telephony device, etc. Connection of such a peripheral component may facilitate programming of the pump speed controller 177.

With regard to the first interface 310A, which couples the pump speed controller 177 to the system controller 176, it should be noted embodiments without such an interface are contemplated. Instead, as was described above, the signals propagated from the system controller 176 via the transmission medium 181 (shown partly in hidden lines) may be coupled directly to the pump 100. However, the provision of the first interface 310A facilitates selective control of the pump speed controller 177 and/or the pump 100 as was described above.

Figure 4:
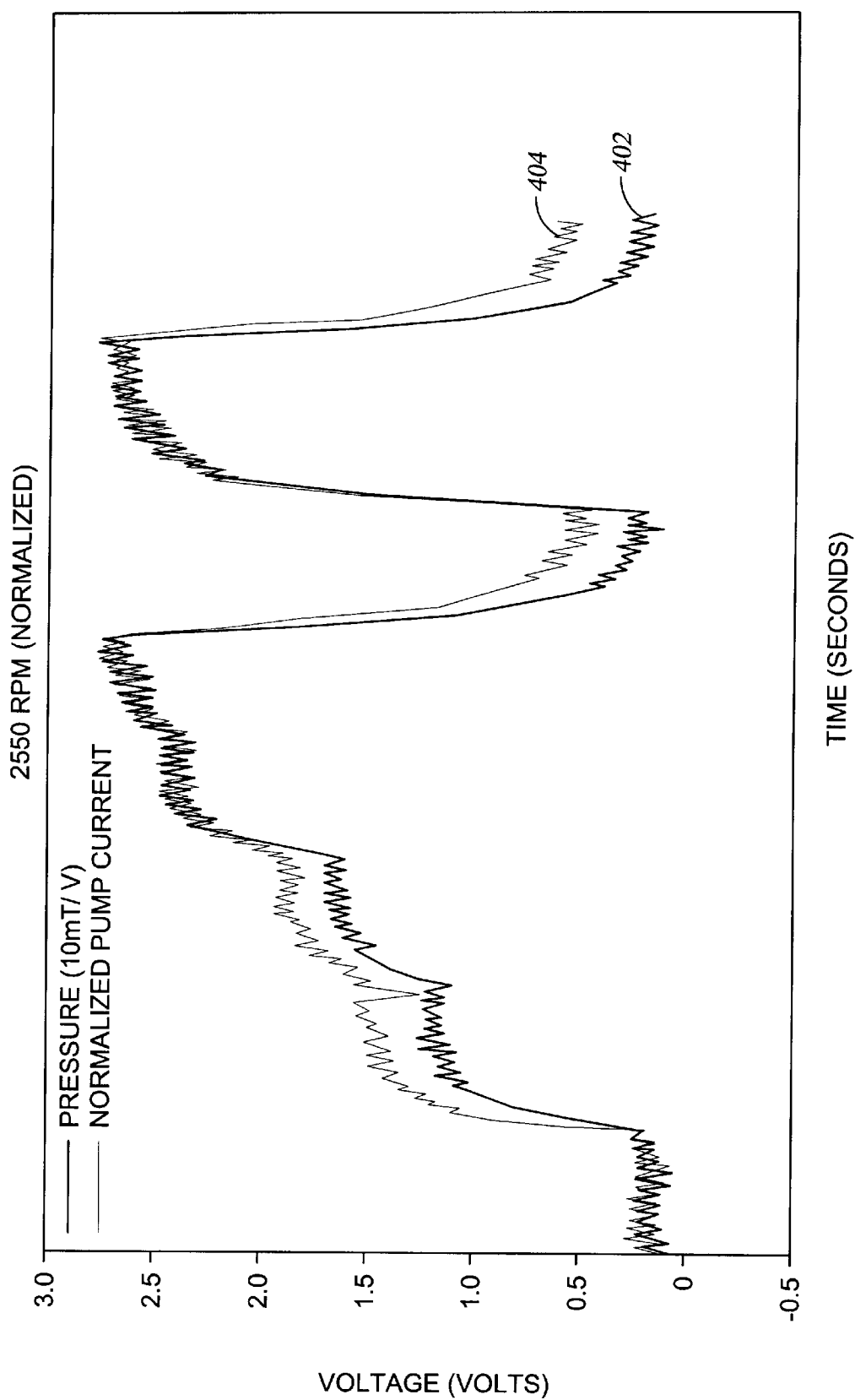
FIG. 4 depicts a graph indicating a relationship between power consumption and pressure of a vacuum system.

Some aspects of the present invention are premised upon an observation by the inventors pertaining to a relationship between pressure and the power consumption of the vacuum pump 140. The pressure/power relationship may be seen in the graph of FIG. 4. In particular, the graph of FIG. 4 shows a pressure curve 402 and a corresponding current curve 404. Both curves represent voltage values (i.e., the output of a pressure sensor and a current sensor) with respect to time. The pressure curve 402 is representative of pressure measurements (where OMT is equivalent to 1 volt) taken in a foreline connecting a load lock to a variable speed pump operating at 5250 RPM. The current measurements were taken by a current sensor monitoring one phase of a three-phase cable. For purposes of facilitating understanding, the current curve 404 has been normalized to remove noise. The initial observation is the close correlation between the pressure curve 402 and the current curve 404. That is, a change in the pressure results in a corresponding change in the current in the same direction. For example, when the pressure drops from about 26 mT at about 59 seconds to about 2 mT at about 72 seconds, the current curve 404 exhibits a corresponding decrease. Similarly, the pressure increase starting at about 72 seconds results in a corresponding current increase. Accordingly, it can be seen that a relatively lower gas load on a pump requires relatively less power while, conversely, a relatively higher gas load requires relatively more power in order to maintain a desired pump speed.

Having observed that the behavior of a pump current is indicative of a gas load on the pump, the inventors determined that such an operating characteristic could be monitored to determine when a speed of the pump may be changed to maintain or obtain a desired chamber pressure through, at least in part, changes in pump speed. One embodiment for using an operating characteristic of a variable speed vacuum, (e.g., the vacuum system 100) in this manner will now be described with reference to FIG. 5.

Figure 5:
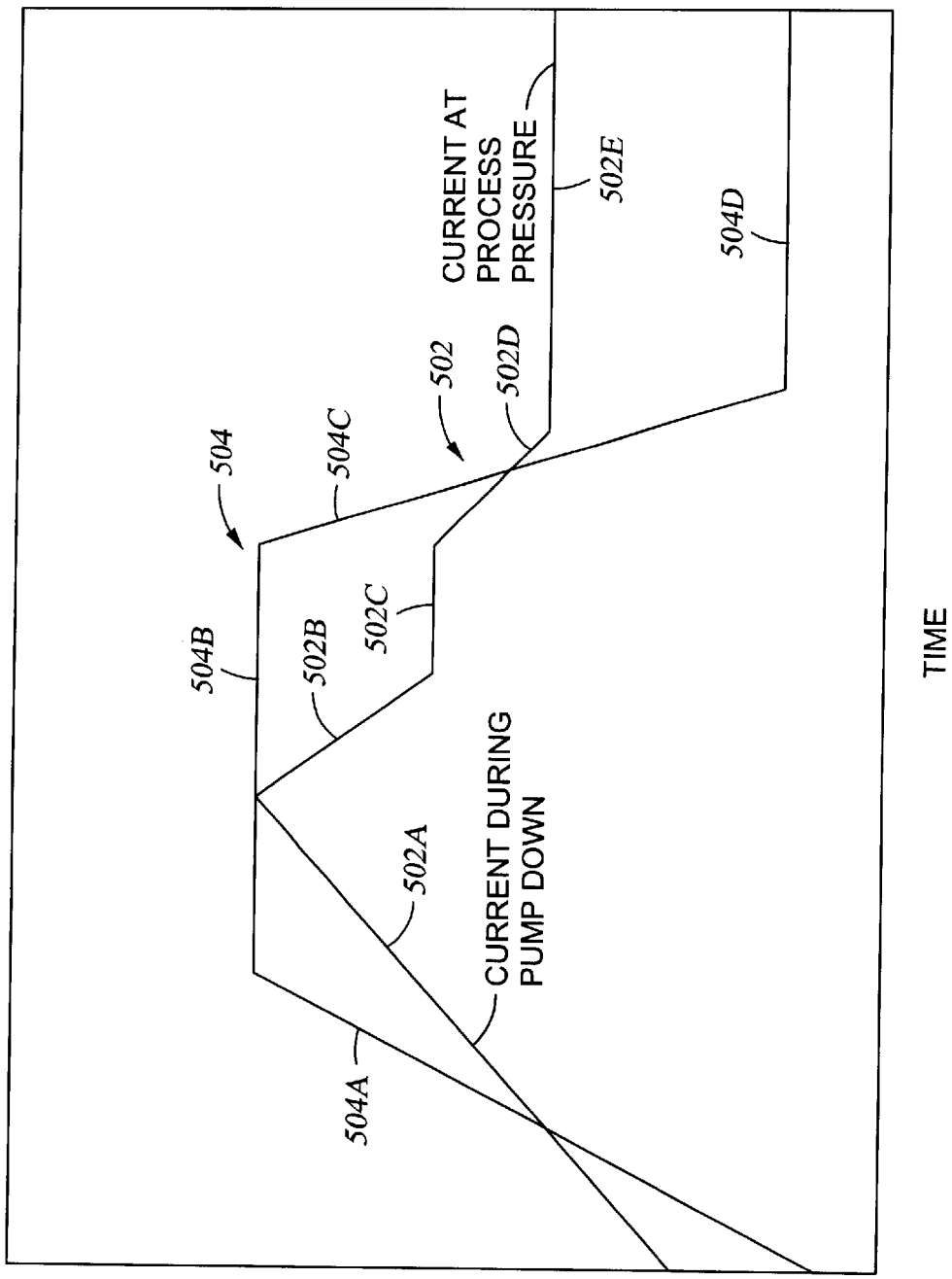
FIG. 5 depicts a graph of current and pump speed.

In general, FIG. 5 shows a current curve 502 representative of the current measured by the sensor 185 in FIG. 1 and a pump speed curve 504 representative of the corresponding behavior (i.e., speed) of the variable speed pump 140. The behavior of the current curve 504 is generally representative of a gas load on the variable speed pump 140. Accordingly, an initial increasing slope 502A indicates a relative increase in the gas load on the pump 140. Upon determining that the slope 502 is indicative of an increased gas load, the pump speed controller 177 issues a control signal causing the variable speed pump 140 to increase its speed. The resulting increase in pumping speed is represented by the slope 504A of the pump speed curve 504. The pumping speed then stabilizes at some speed (as represented by the curve plateau 504B), which may be the maximum pumping speed. Subsequently, the current curve 502 begins a downward slope (slope 502B) indicative of a decreased gas load on the variable speed pump 140. The current curve 502 stabilizes (at curve plateau 502C) when a process pressure is attained in the processing chamber 150. Upon detecting the stabilized gas load (as indicated by the curve plateau 502C), the pump speed controller 177 issues a control signal causing the variable speed pump 140 to decrease its speed, as represented by slope 504C. The resulting stabilized reduced pump speed (which is referred to herein as an idle speed of the variable speed pump 140) is represented by the curve plateau 504D. Decreasing the pump speed to the idle speed is achieved by a decrease in the current (represented by the slope 502D which stabilizes at curve plateau 502E) and, therefore, results in a decrease in the power consumption of the pump 140.

In the foregoing embodiment, the pump speed controller 177 is configured to change the pumping speed of the variable speed pump 140 in response to detecting changes in the gas load on the pump. In one embodiment, a change in the gas load, which requires a corresponding pumping speed change, is detected by monitoring the slope of the current curve 502. Where a sufficient slope of sufficient duration is detected by the pump speed controller 177, the pump speed controller 177 issues a control signal to change the pumping speed of the variable speed pump 140. In another embodiment, the pump speed controller 177 is configured to determine a changing current within some time interval, regardless of slope. That is, only the magnitude of the change in current is monitored. Where a sufficient current change is detected, the pumps speed controller 177 operates to change the pumping speed of the pump 140.

In the embodiment described with respect to FIG. 5, the variable speed pump 140 is varied between only two speeds (represented by the plateau 504B and the plateau 504D). In another embodiment, the variable speed pump 140 may be varied between three or more speeds. One such embodiment will now be described with reference to FIG. 6 and FIG. 7.

Figure 6:
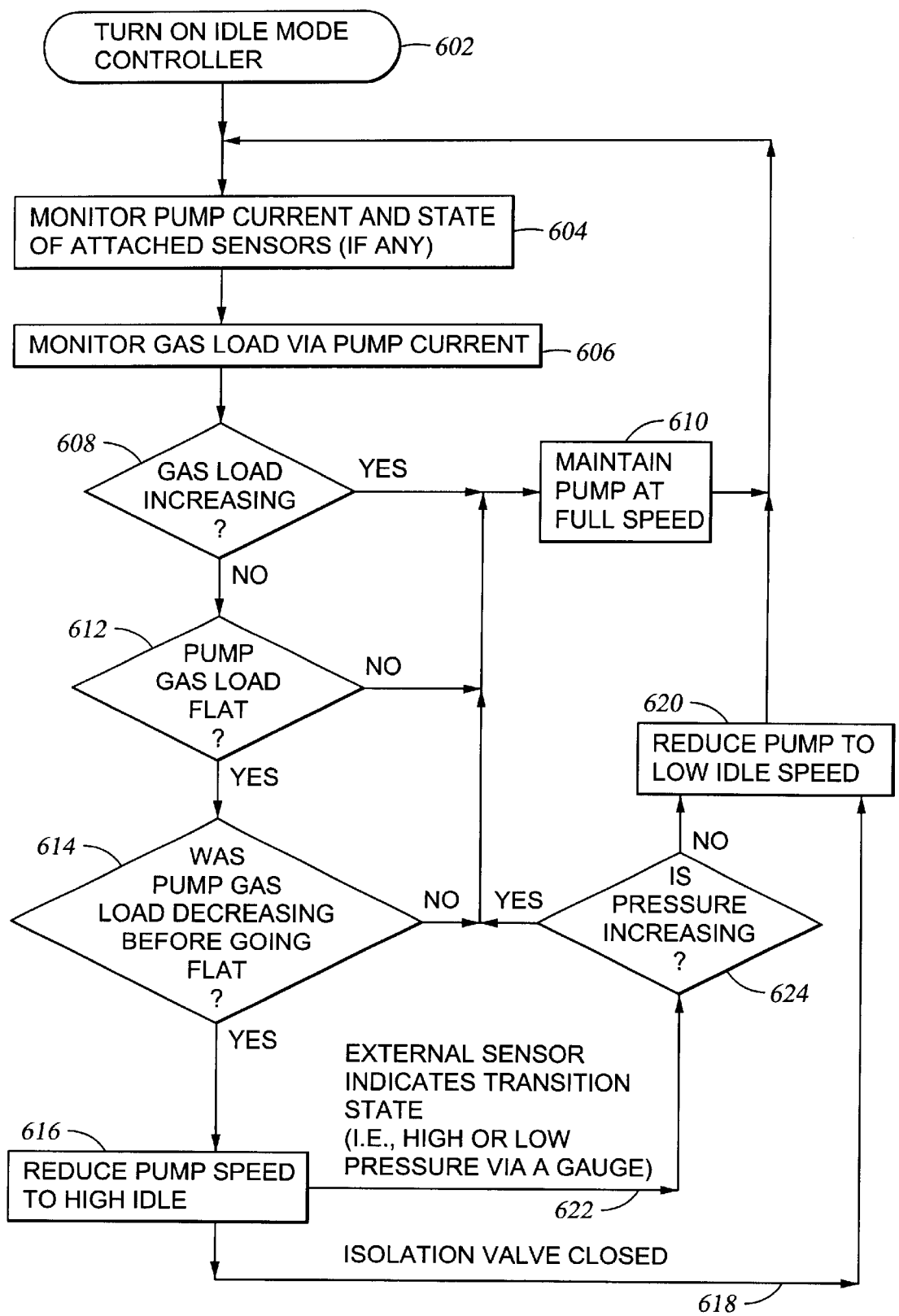
FIG. 6 depicts a flow chart illustrating the operation of a pump speed controller.
Figure 7:
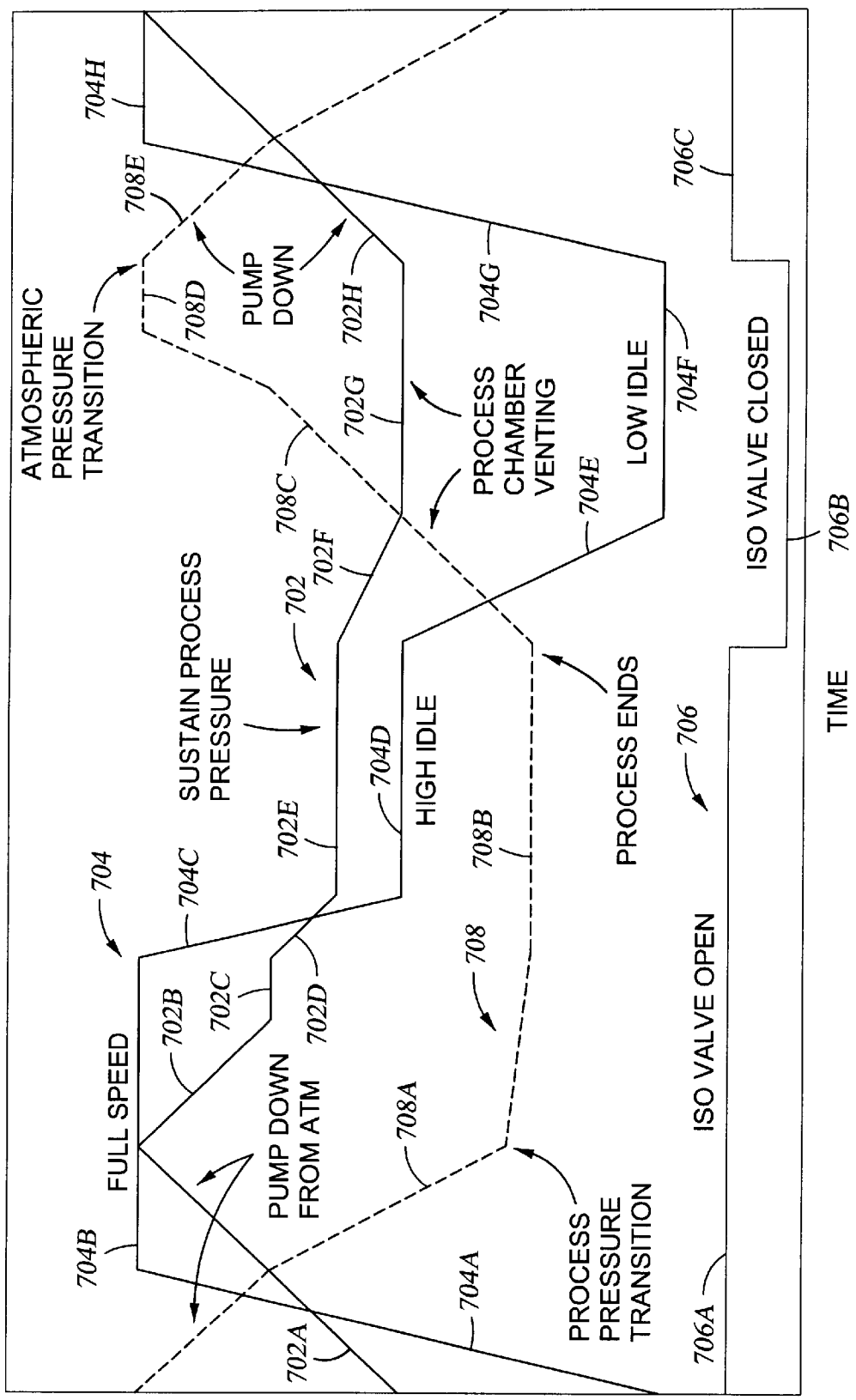
FIG. 7 depicts a graph of current, pump speed, pressure, and isolation valve position.

In particular, FIG. 6 is a method 600 for operating the pump speed controller 177. Illustratively, the method 600 is implemented by executing the pump speed control software 309 (shown in FIG. 3). FIG. 7 shows a plurality of curves representative of the steps of the method 600. Specifically, FIG. 7 shows a current curve 702, a pump speed curve 704, an isolation curve 706 and a pressure curve 708.

Prior to monitoring operating characteristics, steps may be taken to determine system requirements for operating pressure states and associated idle speeds. As used herein, idle speeds (such as is represented by the curve plateau 504D in FIG. 5) are relatively reduced pump operating speeds, whereby power can be conserved and desired processing conditions can still be maintained. Having determined the idle speeds, the pump speed controller 177 can be programmed accordingly. In addition, the pump speed controller 177 can be programmed with external sensor parameters where external sensors (e.g., pressure devices 175A–B) are being used advantage. The pump speed controller 177 can also be programmed with time delays used to filter out spikes and other noise from the current readings. Persons skilled in the art will recognize other parameters that can be used to configure the pump speed controller 177.

With reference to FIG. 6, the pump speed controller 177 is turned on at step 602, at which time the pump speed controller signals the variable speed pump 100 to operate at full speed. With reference to FIG. 7, the slope 704A indicates the increasing speed of the pump 100, which reaches full speed at the plateau 704B. Illustratively, the valve assembly 174 is open (as represented by curve portion 706A), thereby allowing fluid communication between the variable speed pump 100 and the vacuum chamber 150. For purposes of illustration, it is assumed that the vacuum chamber 150 is at atmospheric pressure when the pumping process is initiated. Under these conditions, the vacuum chamber 150 is pumped down, as reflected by the declining pressure curve portion 708A. Because of the gas load and the increasing pump speed, the current curve 702 necessarily ramps up (as indicated by slope 702A).

Once the controller is initialized and the pump is activated, the controller 177 begins monitoring (at step 604) the pump current and the state of any attached sensors. The monitored pump current is processed (at step 606) to determine gas load on the variable speed pump 100. At step 608, the controller 177 determines whether the gas load is increasing. In one embodiment, such a determination is made by observing the slope of the current curve 702. Initially, the slope 702A indicates an increasing gas load. Accordingly, the variable speed pump 100 is maintained at full speed (at step 610).

The foregoing processing is repeated until the controller 177 determines that the gas load is not increasing, at which point the controller 177 determines (at step 612) whether the gas load is substantially constant, as indicated by the current curve 702. Such behavior is reflected in the flat curve portion 702C of the current curve 702 and occurs after the current curve 702 transitions from an incline (slope 702A) and to a decline (slope 702B). This transition occurs substantially commensurate with the achievement of a base pressure (curve portion 708B) within the vacuum chamber 150. At the base pressure, the variable speed pump 100 can be maintained at full speed with a relatively reduced current.

If (at step 612) the controller 177 determines that the gas load is not substantially constant (e.g., the current curve 702 is decreasing (slope 702B)), then the pump 100 is maintained at full speed (step 610) while the controller 177 monitors the decreasing current. When the current curve 702 does indicate a substantially constant gas load (as in the case of the flat curve portion 702C), then the controller 177 determines (at step 614) whether the gas load was decreasing before leveling off. Such behavior is exemplified by the slope 702B and the subsequent leveling off of the current curve 702 at the flat curve portion 702C. Where such behavior is observed, the pump speed is reduced to high idle (step 616). The adjustment to the pumping speed is reflected in the slope 704C and the subsequent flat curve portion 704D. As a result of this reduction in speed, a resulting reduction in power consumption is achieved, reflected in the decrease (slope 702D) of the current curve 702. The current curve 702 then levels off at curve portion 702E.

The pressure, the pump speed and the current are then maintained at substantially constant values until the process in the vacuum chamber 150 is complete. Upon completion of the process within the vacuum chamber 150, the valve assembly 174 is closed (indicated by curve portion 706B) to isolate the vacuum chamber 150 from the variable speed pump 100. In addition, the vacuum chamber 150 is vented to allow the chamber to return to atmospheric pressure, as reflected by the slope 708C of the pressure curve 708. In some cases, these activities may put a gas load on the pump 100 which produces a detectable behavior in the current curve 702. If the controller 177 can detect a reduced gas load by observation of the current curve 702, then the controller 177 may operate to reduce the speed of the pump 100 to a low idle. However, in many cases opening the valve assembly 174 does not have an immediate detectable effect on the current curve 702. Accordingly, in one embodiment the actuation of the valve assembly 174 is used to trigger a change in the pumping speed of the pump 100. Specifically, if the controller 177 determines that the valve assembly 174 has been closed (e.g., by receiving a signal from the pressure switch 187), then processing proceeds along logic line 618 to step 620 where the controller 177 reduces the pump speed to low idle (represented by the slope 704E and the flat curve portion 704F, respectively). Processing then returns to step 604 where the controller 177 again monitors the pump current and the state of any attached sensors. Accordingly, if an increasing gas load is subsequently detected by observation of an increasing current, then the pump 100 is returned to full speed. For example, the controller 177 detects an increased gas load when the valve assembly 174 is opened (curve portion 706C) after the chamber 150 has reached atmospheric pressure (708D) by observing the slope 702H of the current curve 702. In response, the controller 177 signals the pump 100 to speed up from low idle (704F) to full speed (704H). The foregoing processing may then be repeated any number of times.

In some cases, prior to completion of the process, the pressure within the vacuum chamber 150 may fluctuate beyond acceptable limits, but not significantly enough to be detected by observation of current behavior. Accordingly, in some embodiments, external sensors (such as the pressure devices 175A–B) are used to detect transition states (i.e., unacceptable pressure fluctuations). If during high idle (step 616), the controller 177 receives an indication of a transition state from one or more external sensors, then processing proceeds along logic line 622 to step 624. At step 624, the controller 177 determines whether chamber pressure is increasing. If so, processing returns to step 610 where the pump 100 resumes full speed. If the chamber pressure is not increasing, then the pressure is necessarily decreasing, in which case the pump speed is reduced to low idle (at step 620). Processing then returns to step 604 where the controller 177 again monitors the pump current and the state of any attached sensors.

Although aspects of the invention have been described with reference to a vacuum chamber 150, other embodiments are contemplated. For example, in one embodiment, a speed controller of the invention is used to advantage in an air conditioning system. In such a configuration, the speed controller operates the speed of a compressor in manner which advantageously reduces power consumption. Accordingly, persons skilled in the art will recognize that the invention has application to a variety of motor-based technologies.

While the foregoing is directed to embodiments of the present invention, other and further embodiments of the invention may be devised without departing from the basic scope thereof, and the scope thereof is determined by the claims that follow.

What is claimed is:

1. A method of operating a variable speed pump in a vacuum processing environment comprising a vacuum chamber in fluid communication with the variable speed pump, and wherein the variable speed pump is in electrical communication with a power source, the method comprising:

actuating the variable speed pump;

sensing pressure in the vacuum chamber;

increasing the speed of the variable speed pump to a first speed in order to decrease relative pressure in the vacuum chamber;

operating the variable speed puma at the first speed for a period of time;

maintaining a process pressure in the vacuum chamber;

sensing one or more operating characteristics of the variable speed pump indicative of power consumption by the pump, wherein one of the one or more operating characteristics comprises gas load on the pump; and sensing a decrease in gas load on the pump;

in response to determining a decrease of the gas load on the pump, sensing a stabilization of the as load on the pump over a selected period of time; and in response to determining a stabilization of the gas load on the pump, decreasing the speed of the variable speed pump to a second lower speed while still maintaining a process pressure in the vacuum chamber.

2. The method of claim 1, wherein the first speed of the variable speed pump is a full speed mode, and the second speed of the variable speed pump is a high idle mode.

3. The method of claim 2, wherein the sensed one or more operating characteristics further comprises current.

4. The method of claim 2, further comprising monitoring a position of an isolation valve disposed between the vacuum chamber and the variable speed pump.

5. A method of monitoring at least one operating characteristic of a variable speed pump in a semiconductor processing chamber, and wherein the variable speed pump is in electrical communication with a power source, the method comprising:

actuating the variable speed pump by provision of a power signal from the power source to the variable speed pump;

monitoring a behavior of the power signal;

determining a change in the gas load on the variable speed pump by analysis of the monitored power signal; and in response to determining a stabilization of the gas load on the pump, changing a speed of the variable speed pump from a full speed mode to a high idle mode.

6. The method of claim 5, further comprising monitoring a position of an isolation valve disposed between the vacuum chamber and the variable speed pump.

7. A method of operating a variable speed pump in a vacuum processing environment comprising a semiconductor processing chamber in fluid communication with the variable speed pump, and wherein the variable speed pump is in electrical communication with a power source, the method comprising:

operating the variable speed pump, the variable speed pump being operable in at least full, high idle, and low idle operating speeds;

sensing an operating characteristic of the variable speed pump reflective of power consumption by the pump, the sensed operating characteristic comprising a gas load on the pump; and reducing the operating speed of the variable speed pump from full speed to high idle speed when the sensed operating characteristic is indicative of a stabilization of the gas load on the pump.

8. The method of claim 7, wherein:

the sensed operating characteristic further comprises current; and the step of sensing current is performed by a speed controller connected to a current sensor, the current sensor configured to collect a current measurement from a power signal provided from the power source to the variable speed pump.

9. A computer readable medium containing a program which, when executed, performs an operation for controlling a variable speed pump in a vacuum processing environment comprising a vacuum chamber in fluid communication with the variable speed pump, and wherein the variable speed pump is in electrical communication with a power source, the operation comprising:

actuating the variable speed pump;

sensing pressure in the vacuum chamber;

increasing the speed of the variable speed urn to a first speed in order to decrease relative pressure in the vacuum chamber;

operating the variable speed pump at the first speed for a period of time;

maintaining a process pressure in the vacuum chamber;

sensing at least one operating characteristic of the variable speed pump indicative of power consumption by the pump, the at least one operating characteristic comprising gas load on the pump; and sensing a decrease in gas load on the pump;

in response to determining a decrease of the gas load on the pump, sensing a stabilization of the gas load on the pump over a selected period of time; and in response to determining a stabilization of the gas load on the pump, decreasing the speed of the variable speed pump to a second lower speed while still maintaining a process pressure in the vacuum chamber.

10. The computer readable medium of claim 9, wherein the first speed of the variable speed pump is a full speed mode, and the second speed of the variable speed pump is a high idle mode.

11. The computer readable medium of claim 9, wherein the sensed operating characteristic further comprises current.

12. The computer readable medium of claim 9, further comprising monitoring a position of an isolation valve disposed between the vacuum chamber and the variable speed pump.

13. A computer readable medium containing a program which, when executed, performs an operation for monitoring at least one operating characteristic of a variable speed pump in a semiconductor processing chamber, and wherein the variable speed pump is in electrical communication with a power source, the operation comprising:

actuating the variable speed pump by provision of a power signal from the power source to the variable speed pump;

monitoring a behavior of the power signal;

determining a change in the gas load on the variable speed pump by analysis of the monitored power signal; and in response to determining a stabilization of the gas load on the pump, changing a speed of the variable speed pump from a full speed mode to a high idle mode.

14. The computer readable medium of claim 13, further comprising monitoring a pressure within the vacuum chamber.

15. The computer readable medium of claim 13, further comprising monitoring a position of an isolation valve disposed between the vacuum chamber and the variable speed pump.

16. A computer readable medium containing a program which, when executed, performs an operation for operating a variable speed pump in a vacuum processing environment comprising a semiconductor processing chamber in fluid communication with the variable speed pump and wherein the variable speed pump is in electrical communication with a power source, the operation comprising:

for an operating speed of the variable speed pump, sensing an operating characteristic of the variable speed pump reflective of a gas load on the pump;

sensing a decrease in gas load on the pump;

in response to determining a decrease of the gas load on the pump, sensing a stabilization of the gas load on the pump over a selected period of time; and in response to determining a stabilization of the gas load on the pump, issuing a control signal to reduce a speed of the variable speed pump while still maintaining a process pressure in the vacuum chamber.

17. The computer readable medium of claim 16, wherein:

the sensed operating characteristic further comprises current; and the step of sensing current comprises receiving a signal from a current sensor, the current sensor configured to collect a current measurement from a power signal provided from the power source to the variable speed pump.

18. A pump speed controller, comprising:

a processor;

a sensor interface connected to the processor for receiving sensor input from a sensor configured to collect pump operating data;

a control signal interface connected to the processor for transmitting a control signal to a variable speed vacuum pump;

a pressure switch interface for receiving a valve position signal;

wherein the processor is configured by instructions to perform an operation comprising outputting a control signal instructing the variable speed vacuum pump to change its speed upon receipt, via the sensor interface, of pump operating data indicative of a decrease in the gas load, followed by a stabilization of the gas load on the variable speed vacuum pump.

19. The pump speed controller of claim 18, further comprising a system controller interface for connecting to a semiconductor processing system.

20. The pump speed controller of claim 18, further comprising a pressure sensor interface for receiving pressure measurements indicative of a pressure in chamber being pumped by the variable speed pump.

21. The pump speed controller of claim 18, wherein the sensor interface is a current sensor interface and the sensor input is current data of a power signal for the variable speed pump.

22. A vacuum pump control system, comprising:

a vacuum chamber;

a variable speed vacuum pump connected to the vacuum chamber;

a power supply in electrical communication with the variable speed vacuum pump;

a sensor configured to collect operating characteristic information of the speed controller, wherein the operating characteristic information is reflective of a gas load on the variable speed vacuum pump; and a pump speed controller in communication with the variable speed vacuum pump and the sensor and configured to issue speed control signals to the variable speed pump in response to sensor input from the sensor;

and wherein the variable speed pump comprises a motor driver configured to maintain a pump speed setpoint according to a speed control signal issued by the speed controller, with the pump speed setpoint being selected to pump the vacuum chamber to a base pressure, and to reduce the pump speed from a full speed to a high idle speed in response to a stabilization of the gas load.

23. The system of claim 22, further comprising a foreline connecting the variable speed vacuum pump to the vacuum chamber.

24. The system of claim 22, wherein the pump speed controller is configured to determine a change in the gas load by analysis of the collected operating characteristic information.

25. The system at claim 22, wherein the pump speed controller is configured to issue a speed control signal reducing a speed of the variable speed pump upon determining that the gas load has stabilized.

* * * * *

UNITED STATES PATENT AND TRADEMARK OFFICE
CERTIFICATE OF CORRECTION

PATENT NO. : 6,739,840 B2
DATED : May 25, 2004
INVENTOR(S) : Mark William Curry, Daniel Paul Greenbank and Danny Cam Toan Lu It is certified that error appears in the above-identified patent and that said Letters Patent is hereby corrected as shown below:

Column 6,
Line 53, change "by-bass" to -- by-pass --;

Column 12,
Line 33, change "puma" to -- pump --;
Line 42, change "as" to -- gas --;

Column 13,
Line 41, change "urn" to -- pump --.

Signed and Sealed this

Twenty-third Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,739,840 B2
DATED : May 25, 2004
INVENTOR(S) : Mark William Curry et al.

It is certified that error appears in the above-identified patent and that said Letters Patent is hereby corrected as shown below:

Title page,
Insert Item:
-- [73] Assignee: Applied Materials, Inc., P.O. Box 450-A, Santa Clara, CA 95052, (US) --;

Column 6,
Line 53, change "by-bass" to -- by-pass --;

Column 12,
Line 33, change "puma" to -- pump --;
Line 42, change "as" to -- gas --;

Column 13,
Line 41, change "urn" to -- pump --.

Signed and Sealed this

Sixth Day of September, 2005

JON W. DUDAS
*Director of the United States Patent and Trademark Office*